United States Patent
Lindholm et al.

(10) Patent No.: US 10,099,627 B2
(45) Date of Patent: Oct. 16, 2018

(54) ROOF MOUNTED BIKE CARRIER

(71) Applicant: Thule Sweden AB, Hillerstorp (SE)

(72) Inventors: Olof Lindholm, Värnamo (SE);
Morgan Lindell, Värnamo (SE);
Andreas Arvidsson, Sävsjö (SE)

(73) Assignee: Thule Sweden AB, Hillerstorp (SE)

( * ) Notice: Subject to any disclaimer, the term of this patent is extended or adjusted under 35 U.S.C. 154(b) by 199 days.

(21) Appl. No.: 15/233,580

(22) Filed: Aug. 10, 2016

(65) Prior Publication Data

US 2017/0050577 A1 Feb. 23, 2017

(30) Foreign Application Priority Data

Aug. 17, 2015 (EP) ..................................... 15181289

(51) Int. Cl.
*B60R 9/10* (2006.01)
*B60R 9/045* (2006.01)
*B60R 9/048* (2006.01)

(52) U.S. Cl.
CPC ............... *B60R 9/048* (2013.01); *B60R 9/10* (2013.01); *B60R 9/045* (2013.01)

(58) Field of Classification Search
CPC .................................. B60R 9/10; B60R 9/045
USPC ................... 224/319, 321, 324, 924
See application file for complete search history.

(56) References Cited

U.S. PATENT DOCUMENTS

| | | | |
|---|---|---|---|
| 5,762,248 A * | 6/1998 | Englander | B60R 9/048 224/315 |
| 6,439,397 B1 | 8/2002 | Reeves | |
| 6,827,244 B1 * | 12/2004 | Stapleton | B60R 9/042 224/310 |
| 6,868,998 B2 * | 3/2005 | Dean | B60R 9/048 224/324 |
| 6,892,913 B1 * | 5/2005 | Andersson | B60R 9/10 224/172 |
| 6,938,782 B2 * | 9/2005 | Dean | B60R 9/048 211/17 |
| 7,481,344 B2 * | 1/2009 | Naslund | B60R 9/048 224/319 |
| D623,117 S * | 9/2010 | Farber | D12/408 |
| 9,187,047 B2 * | 11/2015 | Sautter | B60R 9/048 |

(Continued)

FOREIGN PATENT DOCUMENTS

WO  WO 2003/106221  12/2003

OTHER PUBLICATIONS

Partial European Search Report for European Application No. 15 181 289.8, European Patent Office, Berlin, Germany, dated Feb. 22, 2016, 6 pages.

*Primary Examiner* — Justin Larson
(74) *Attorney, Agent, or Firm* — Sterne, Kessler, Goldstein & Fox P.L.L.C.

(57) ABSTRACT

Disclosed is a supporting structure for a roof mounted bike carrier having a wheel tray. The supporting structure includes a first attachment part and a second attachment part which is separable from the first attachment part. The supporting structure includes a bike supporting device having a coupling section coupled to the first attachment part and adapted to support a bike with a supporting section thereof. The first attachment part and the second attachment part are structured so as to be invertedly couplable for providing respective reversed positions of the bike supporting device with respect to the second attachment part.

14 Claims, 4 Drawing Sheets

(56) References Cited

U.S. PATENT DOCUMENTS

| | | | |
|---|---|---|---|
| 9,333,922 B2 * | 5/2016 | Laverack | B60R 9/045 |
| 9,649,986 B2 * | 5/2017 | Pedrini | B60R 9/10 |
| D789,276 S * | 6/2017 | Adler | D12/407 |
| 2003/0042281 A1 | 3/2003 | Ishikura | |
| 2014/0144959 A1 * | 5/2014 | Sautter | B60R 9/045 |
| | | | 224/321 |
| 2014/0144960 A1 * | 5/2014 | Condon | B60R 9/10 |
| | | | 224/324 |
| 2016/0068111 A1 * | 3/2016 | Walker | B60R 9/06 |
| | | | 224/521 |
| 2018/0022286 A1 * | 1/2018 | Settelmayer | E05B 71/00 |

* cited by examiner

ROOF MOUNTED BIKE CARRIER

FIELD

The present invention relates to a supporting structure for a roof mounted bike carrier comprising a wheel tray.

BACKGROUND

Roof mounted bike carriers are widely used. Such bike carriers typically comprised a rail on which the bike is supported as well as a fixation mechanism for fixing the bike in an upright condition. Such bike carriers are typically constructed to support a single bike. Furthermore, the bike carriers are constructed so as to be mountable on a load carrier system mounted on the roof of a vehicle. Such load carrier systems typically comprise two crossbars which are mountable to the roof of the vehicle cross to the vehicle's longitudinal direction. It is possible, to mount multiple bike carriers next to each other on the cross bars of such load carrier systems.

Focus has been put on the construction of such bike carriers in order to enhance the mountability of bikes thereon, in particular with respect to bike supporting devices which are able to support the bike in one of different regions of the bike and which are coupled to the wheel tray. As such bike supporting devices, single-sided arms for holding a bicycle frame are known. Such single-sided arms allow the mounting of a bicycle from only one side of the wheel tray. Therefore, mechanisms have been provided which allow an inverted application of the single-sided arms with respect to the wheel tray. However, the known mechanisms are rather complex and the actions to be taken by a user for invertedly providing the single-sided arms is time consuming and annoying for each bike carrier.

SUMMARY

The present invention addresses the above problem and it is the object of the invention to provide a supporting structure for a roof mounted bike carrier which allows for an easier way of invertedly arranging a bike supporting device.

The object is solved by a supporting structure for a roof mounted bike carrier according to claim one as well as by a roof mountable bike carrier comprising such a supporting structure.

According to the invention, a supporting structure for a roof mounted bike carrier comprising a wheel tray is provided. The supporting structure comprises a first attachment part and a second attachment part being separable from the first attachment part and a bike supporting device having a coupling section coupled to the first attachment part and adapted to support a bike with a supporting section thereof. The first attachment part and the second attachment part are structured so as to be invertedly couplable for providing respective reversed positions of the bike supporting device with respect to the second attachment part.

Since the first attachment part and the second attachment part are invertedly couplable for providing respectively reversed positions of the bike supporting device, it is possible to achieve the reversed position of the bike supporting device by decoupling the first attachment part from the second attachment part, inverting the position of the first attachment part with respect to the second attachment part and coupling the inverted first attachment part to the second attachment part thereby providing a reversed position of the bike supporting device. By this, it is possible to provide the reversed position of the bike supporting device without inverting the whole supporting structure. In other words, the position of the second attachment part does not need to be changed in order to achieve the reversed position of the bike supporting device. With this configuration, it is possible to leave the second attachment part fixedly mounted to another element.

Preferably, the first attachment part comprises a crossbar attachment part fixedly mountable on a crossbar of a vehicle load carrier system. Accordingly, the first attachment part is mountable to a crossbar of a vehicle load carrier system. As described above, the bike supporting device is coupled to the first attachment part. Accordingly, a force acting on the bike supporting device can be transmitted to the first attachment part and to the crossbar when the supporting structure is mounted on the crossbar.

The second attachment part can comprise a wheel tray attachment part fixedly mountable to an underside of a wheel tray of the bike carrier. Accordingly, the second attachment part is fixedly mountable to the wheel tray. Since the second attachment part can be fixedly mounted to the wheel tray and the first attachment part is separable from the second attachment part, it is possible to change the position of the first attachment part with respect to the second attachment part and consequently with respect to the wheel tray. Since the bike supporting device is coupled to the first attachment part, changing the position of the first attachment part also changes the position of the coupling section of the bike supporting device with respect to the wheel tray.

In an advantageous embodiment, the bike supporting device is rotatably coupled to the first attachment part. Accordingly, the coupling section can be rotatably accommodated in the first attachment part. Hence, the bike supporting device is rotatably supported by the first attachment part and is allowed to perform a swiveling movement. By this, the supporting section is movable and it is possible to move the supporting section to a suitable supporting position for the bike to be transported.

Preferably, an axis of rotation of the bike supporting device is parallel to a crossbar of a load carrier system of a vehicle in a mounted condition. Thus, when the bike carrier having such a supporting structure is mounted on the load carrier system of the vehicle, it is possible to rotatably move the supporting section of the bike supporting device in the front and rear direction of the vehicle. In other words, the supporting section of the bike supporting device is movable in a plane extending in the longitudinal and vertical direction of the vehicle.

In a preferable embodiment, the bike supporting device and the first attachment part form an integral assembly. With such a construction, it is possible to position both elements in one piece. In order to form such an integral assembly, the bike supporting device can be releasably or non-releasably coupled to the first attachment part at its coupling section. For example, the coupling section can comprise a tube-like shape and can be rotatably mounted to the first attachment part by means of a bracket fixedly mounted to the first attachment part at its free ends and surrounding the coupling section.

According to a further advantageous embodiment, the supporting structure further comprises a quick release mechanism for coupling and decoupling the first attachment part and the second attachment part. The quick release mechanism is preferably formed as a mechanism allowing to uncouple the first attachment part and the second attachment part from each other with a single movement or easy movement. Such a quick release mechanism has the benefit that the actions to be taken by a user in order to couple and decouple the first attachment part is reduced to a minimum so that the operability of the supporting structure is further enhanced.

The quick release mechanism can comprise a rotatable coupling element rotatable between a locking position in which the second attachment part is fixedly coupled to the first attachment part and an unlocking position in which the second attachment part is separable from the first attachment part. Accordingly, the quick release mechanism can be a turn-to-lock mechanism. For example, the quick release mechanism can be a quick release screw having an engaging section allowing for an engagement with the second attachment part and being rotatably supported against a flange provided in the first attachment part. By this, a fixed connection between the first attachment part and the second attachment part can be achieved with a simple rotational movement of the screw. Depending on the configuration of the bike carrier, the quick release mechanism can be provided as a simple mechanism allowing for a simple connection of both attachment parts. Nevertheless, it can be enough to use the quick release mechanism for the coupling of the attachment parts without the necessity of using an extra coupling between both attachment part.

The rotatable coupling element can be adapted to be moved substantially one fourth rotation, for example a rotation about 90 degrees, from the locking position to the unlocking position. Accordingly, the movement distance of the rotatable coupling element can be relatively short thereby allowing to lock and unlock the first attachment part and the second attachment part with only little movement. By this, the operability of the quick release mechanism is further enhanced.

Preferably, the coupling element is operable by hand or by use of a screw driver. For example, the coupling element can be realized as a thumbscrew or can be realized as a bolt having an engaging recess for the screw driver at one end.

According to a preferable embodiment, the first attachment part and the second attachment part comprise attachment openings for accommodating attachment means for fixing the first and second attachment parts to a crossbar of a load carrier system. The attachment openings can be arranged in the first and second attachment parts such that attachment openings of a second attachment are lined with attachment openings of the first attachment part when the attachment parts are coupled to each other.

Preferably, the attachment openings are arranged symmetrically on the attachment parts. By providing a symmetrical arrangement of the attachment openings, it is possible to maintain the positions of the attachment openings even if the first attachment part and the second attachment part are invertedly coupled.

The supporting structure can furthermore be adapted to support the attachment means. The attachment means can comprise a tensioning member and an engaging member wherein the engaging member is preferably formed as a T-shaped element for an engagement with a corresponding nut. The tensioning member can be a tension lever able to exert a tensioning force on an end portion of the engaging member. Preferably, the attachment openings in the first attachment part are formed such that the engaging member is passable therethrough. Accordingly, it is possible to release the first attachment part from the second attachment part without the need to disassemble the attachment means. Furthermore, in such a construction, the first attachment part is clamped between a cross bar and the second attachment part when the attachment means is tensioned. Accordingly, the first attachment part is firmly held between the second attachment part and a cross bar. Consequently, it is enough to provide a simple connection between the first and second attachment parts, e.g. by means of the above described quick release mechanism.

The first attachment part can comprise a covered bottom portion adapted to contact a crossbar of a load carrier system. The covered bottom portion can comprise a substantially continuous surface for preventing an accumulation of dirt on the load carrier and for reducing a noise generation.

The supporting section can be adapted to hold a bike frame, a crank arm or a wheel of a bike. Furthermore, the bike supporting device can comprise a supporting arm having different configurations. The supporting structure can be configured to be usable for different types of supporting device, for example different types of supporting arms. For instance, the supporting structure can be configured to allow a support of supporting arms protruding from only one side of the supporting structure or of supporting arms protruding from both sides of the supporting structure. Accordingly, the supporting structure can be constructed standardized and therefore be used in different types of roof mounted bike carriers.

In an advantageous embodiment, a roof mountable bike carrier comprising a wheel tray and a supporting structure according to the above is provided, wherein the supporting structure is preferably mounted to the wheel tray with the second attachment part being attached to an underside of the wheel tray.

According to a further aspect of the present subject matter, a quick release mechanism of a supporting structure for a roof mountable bike carrier is provided. The supporting structure is configured to releasably and rotatably accommodate a coupling portion of a bike supporting device in a rotation sleeve thereof. The quick release mechanism is configured to selectively change a condition of the rotation sleeve between a locked condition in which the coupling section cannot be pulled out from said rotation sleeve and a release condition in which the coupling section can be pulled out form the rotation sleeve.

The quick release mechanism is preferably a clamping mechanism or a turn-to-lock mechanism. Furthermore, the rotation sleeve can comprise a variable inner dimension, wherein the inner dimension is smaller in the locked condition and is larger in the release condition. With such a quick release mechanism, it is possible to releasably fix the bike supporting device, for instance a bike supporting arm, on the supporting structure.

As mentioned above, the quick release mechanism can be a clamping mechanism. The clamping mechanism is preferably structured to provide a sufficient clamping force by tilting a tensioning lever, for instance. On the other hand, the quick release mechanism can be of the above mentioned turn-to-lock type meaning that a rotational movement of less than a full turn of an engagement element changes the condition from locked to unlocked.

Such a quick release mechanism allows to easily dismount the bike supporting device from the supporting structure and to mount the bike supporting device in an inverted manner on the supporting structure. In this connection, it is preferable if the rotation sleeve is structured such that it is accessible from two opposite sides of the supporting structure so that the coupling section of the bike supporting device can be inserted from either of the two sides.

DETAILED DESCRIPTION

Figure 1:
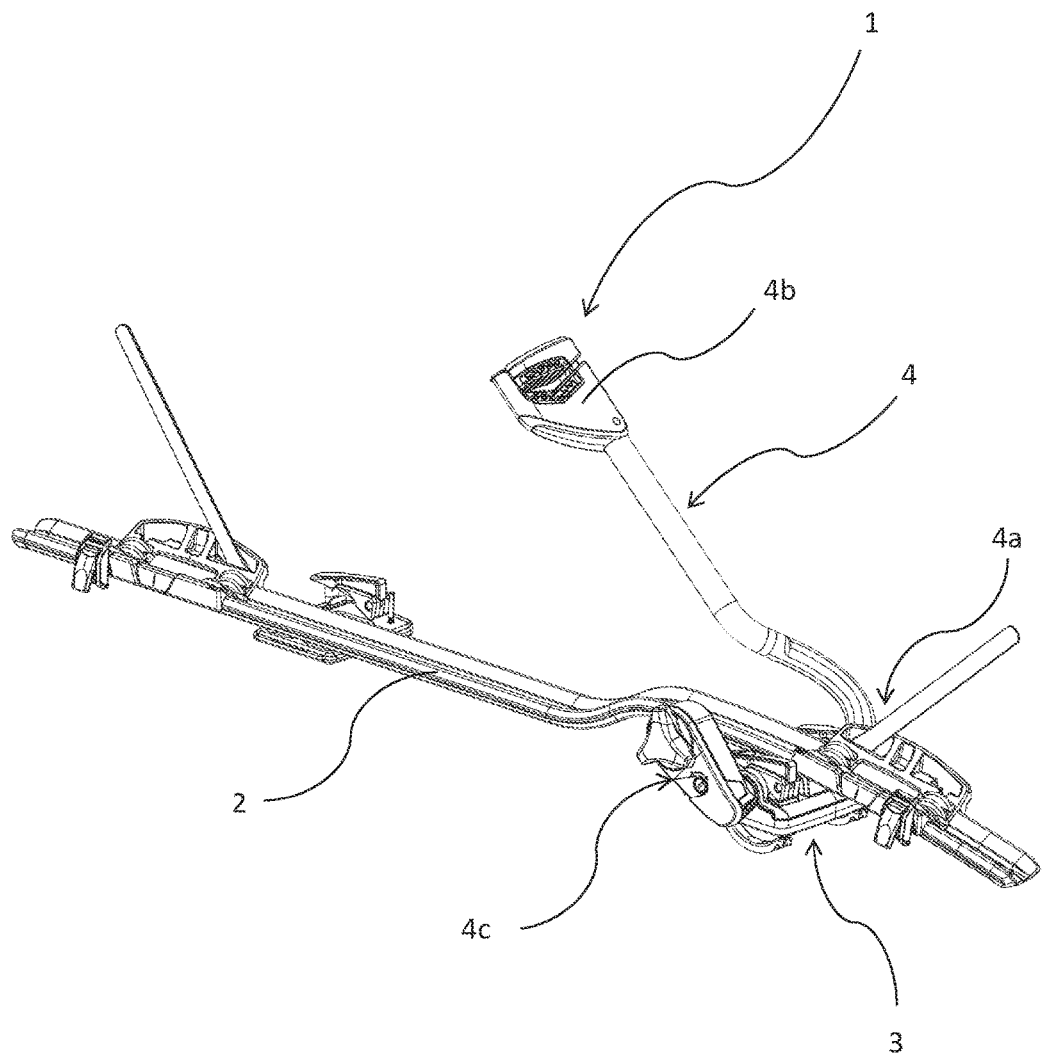
FIG. 1 shows a perspective schematic view of a roof mountable bike carrier according to an embodiment of the present subject matter.

In the following, an embodiment as well as modifications of the present subject matter will be described with reference to the drawings. It is to be noted that similar elements in the drawings are denoted with the same reference signs.

FIG. 1 shows a bike carrier 1 in a perspective view. The bike carrier 1 comprises a wheel tray 2 and a supporting structure 3 mounted to an underside of the wheel tray 2. A bike supporting device in the form a supporting arm 4 is rotatably coupled to the supporting structure 3 at a coupling section 4a thereof and comprises a claw grip 4b on the other end thereof. In the present embodiment, the claw grip 4b is configured to grip a portion of a frame of the bike to be transported. An operating mechanism 4c is provided on the supporting arm 4 on an opposite side of the supporting structure which allows to open and close the claw grip 4b.

Figure 2:
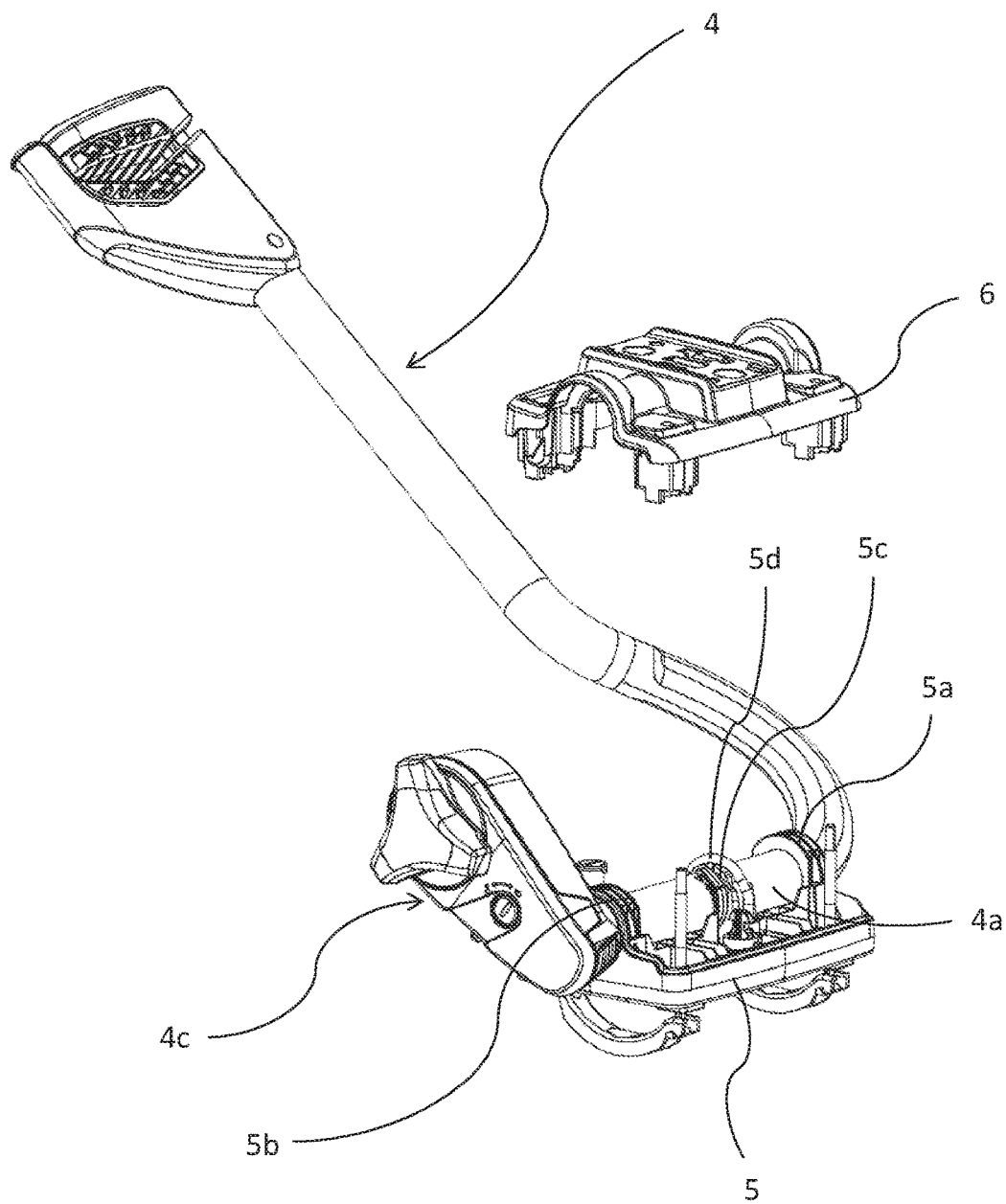
FIG. 2 shows a perspective partially exploded view of a supporting structure according to an embodiment of the present subject matter.

The supporting structure 3 as well as the supporting arm 4 are also shown in FIG. 2 in which the supporting structure 3 is shown in a partially exploded view. As can be seen from FIG. 2, the supporting structure 3 comprises a two part configuration, more precisely a bottom portion 5 forming a first attachment part and a top portion 6 forming a second attachment part. As is indicated in FIG. 2, the bottom portion 5 and the top portion 6 of the supporting structure 3 are separable from each other. Furthermore, the supporting arm 4 is coupled to the lower portion 5 at the coupling section 4a thereof. In order to support the coupling section 4a of the supporting arm 4 on the lower portion 5 of the supporting structure 3, two guiding sleeves 5a and 5b are provided into which the coupling section 4a is inserted. Furthermore, a fixation sleeve 5c with a variable inner diameter is also provided. A bracket 5d is provided on the fixation sleeve 5c and is supported on the bottom portion 5. The bracket 5d has a function to apply a force on the fixation sleeve 5c thereby constricting the inner diameter in order to prevent the supporting arm from moving in the direction of a rotational axis of the same. Furthermore, varying the inner diameter allows to vary a frictional force between the coupling section 4a and the fixation sleeve 5c in order to configure how easy the supporting arm 4 can be rotated.

Figure 3:
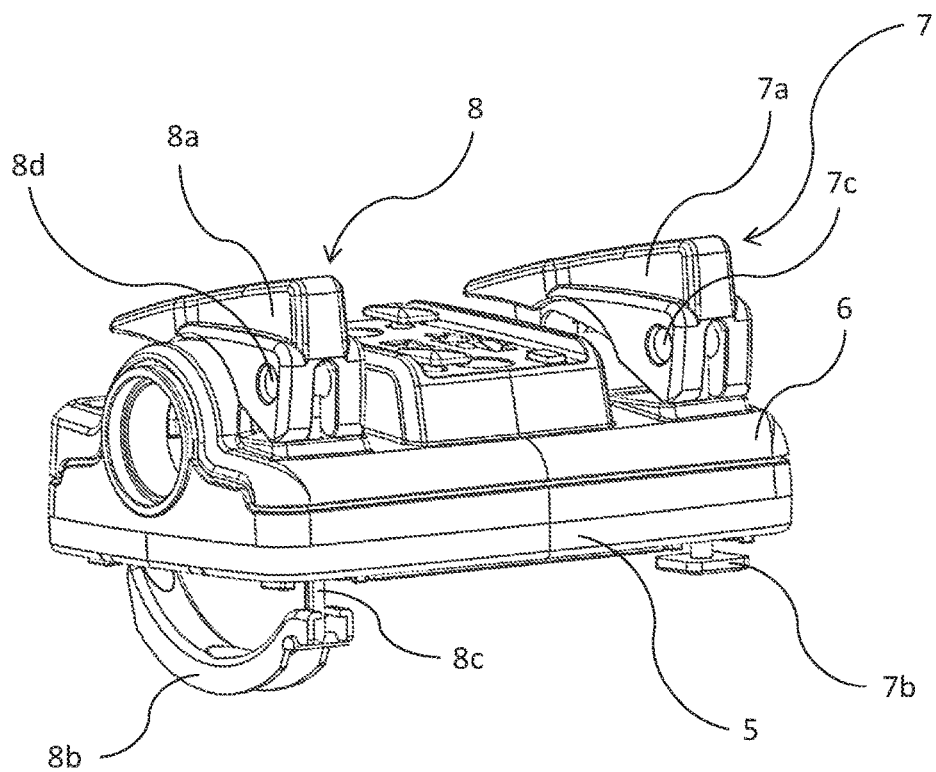
FIG. 3 shows a perspective view of main elements of the supporting structure.

FIG. 3 shows the supporting structure 3 in a condition in which the bottom portion 5 and the top portion 6 are coupled to each other wherein the supporting arm is omitted. Furthermore, attachment means 7, 8 are shown comprising a tensioning lever 7a, 8a as well as engaging members 7b, 8b, 8c and pins 7c, 8d for force-transmittingly coupling the engaging members 7b, 8c to the tensioning levers 7a, 8a.

In the configuration as shown in FIG. 3, two different attachment means are shown. The basic principle of both attachment means resides in the provision of counter elements which are engageable with cross bars of a load carrier system and connecting them to tensioning levers such that the supporting structure can be firmly pressed against the cross bar by movement of the counter elements towards the first attachment part.

The attachment means 7, 8 differ from each other in that the engaging members are structured differently. Attachment means 7 is used in order to engage with a nut provided in a cross bar of a load carrier system. Therefore, attachment means 7 comprises a T-shaped screw 7b structured so as to be able to be inserted into the nut and being coupled to the tensioning lever 7a by means of pin 7c into which the T-shaped screw 7b is screwed. Attachment means 8 comprises a bracket 8b and a tensioning rod 8c. The bracket is movably supported on the bottom portion 5 at one end and is couplable to the lower end of the tensioning rod 8 at its other end. The tensioning rod 8 is coupled to pin 8d at its upper end. Thus, by movement of the tensioning rod 8, the distance between the bracket and the lower side of the bottom portion 5 can be varied. It is to be noted that in practical use, only one kind of attachment means is used on the supporting structure.

According to the embodiment, the top portion 6 and the bottom portion 5 of the supporting structure 3 are provided with openings which in a coupled condition of the top portion 6 and the bottom portion 5 are aligned. The construction of the openings is described with reference to FIGS. 5 and 6.

Figure 5:
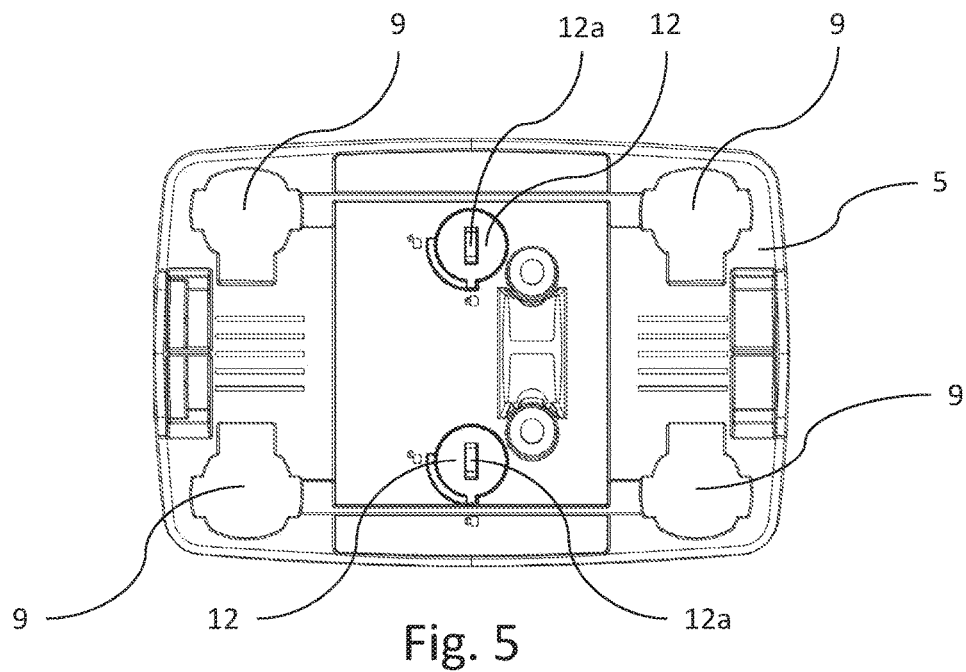
FIG. 5 shows a view of the bottom portion of the supporting structure as viewed from below.

FIG. 5 shows the lower side of the bottom portion 5. In use, the lower side gets in contact with the cross bars of a load carrier system. The lower side comprises a substantially continuous surface. In other words, recesses or openings are provided only where necessary. Therefore, an excessive accumulation of dirt on the bottom portion 5 is prevented during use. Furthermore, the bottom portion 5 comprises four symmetrically shaped openings 9. These openings 9 are structured such that the tensioning rod as well as the T-shaped screw, in particular the portions of the elements for an engagement with the bracket or the cross bar, can be passed through the bottom portion 5. This has the beneficial effect that the bottom portion 5 can be separated from the top portion 6 in a simple manner without the need to remove the tensioning rod 8c or the T-shaped screw 7b.

Figure 6:
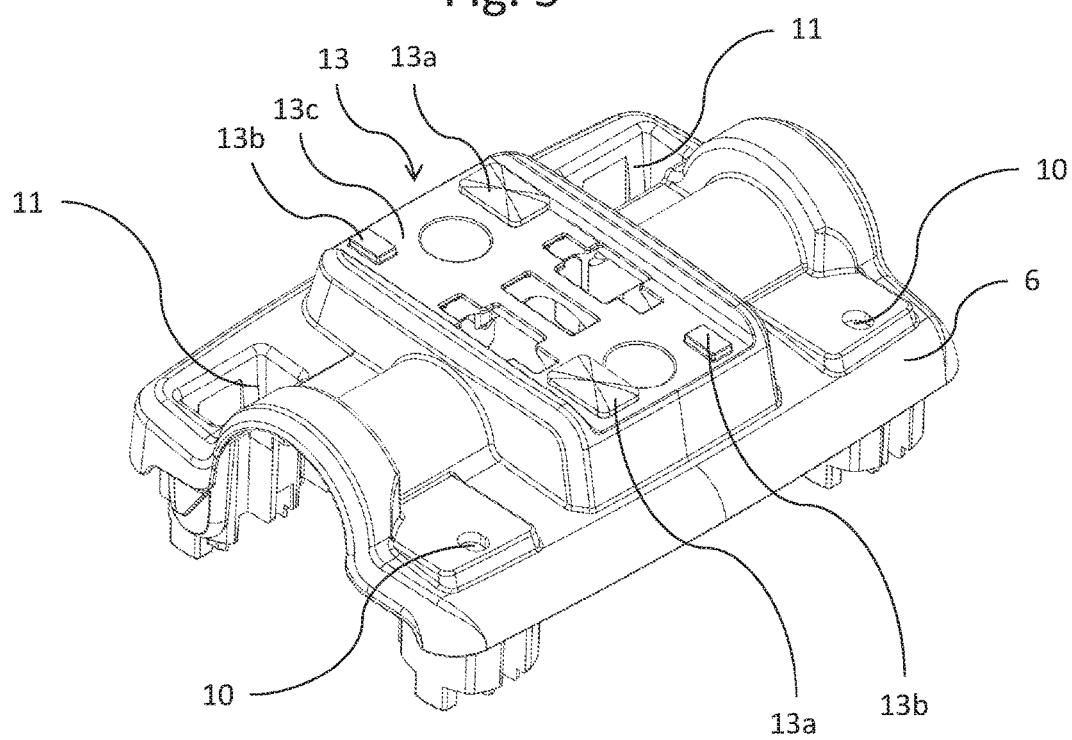
FIG. 6 shows a top portion of the supporting structure according to an embodiment of the present subject matter.

FIG. 6 shows the top portion 6 in a perspective view. Openings 10 and 11 are provided in order to partially accommodate the engaging members 7b, 8b, 8c. Openings 10 are structured as through holes having a dimension allowing to pass a coupling section of the tensioning rod and the T-shaped screw therethrough. Openings 11 are structured as recesses which allow to pass a substantial portion of the bracket therethrough and to support one end of the bracket 8b therein.

Figure 4:
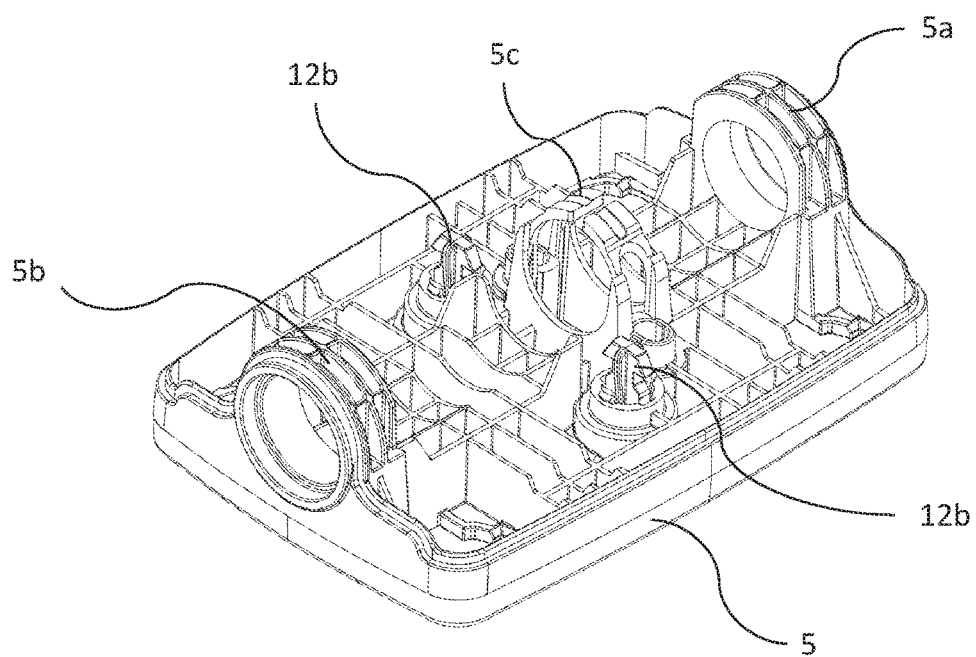
FIG. 4 shows a perspective view of a bottom portion of the supporting structure according to an embodiment of the present subject matter.

FIG. 5 further shows quick release elements 12 of a quick release mechanism. The quick release elements 12 are rotatably mounted in the bottom portion 5 and comprise engagement recesses 12a in their lower portions allowing to operate the same from the lower side of the supporting structure 3. As indicated in FIG. 5, the quick release elements are rotatable from a locking position into an unlocking position by way of rotating them about 90 degrees. As is shown in FIG. 4, the quick release elements 12 comprise engaging sections 12b structured to allow an engagement with the top portion 6 of the supporting structure 3. FIG. 4 also shows the above mentioned fixation sleeve 5*c* in greater detail.

Moreover, FIG. 6 shows a wheel tray attachment section 13 of the top portion 6. The wheel tray attachment section 13 comprises an abutment surface which is in contact with the lower portion of the wheel tray in a mounted condition. Furthermore, the wheel tray attachment section 13 comprises guiding protrusions 13*b* protruding from the attachment surface and adapted to engage with recesses provided in the underside of the wheel tray. In order to securely fix the top portion 6 to the underside of the wheel tray as shown in FIG. 1, the wheel tray attachment section 13 comprises attachment means in the form of T-shaped screws 13*a* which are structured similar to the T-shaped screw 7*b*. The T-shaped screws 13*a* comprise an engaging section and are partially accommodated in an opening of the top portion 6 such that the engaging section protrudes in the upward direction and allows an engagement with a corresponding recess on the wheel tray 2. The opposite end of the T-shaped screw is provided with a nut which allows tensioning the T-shaped screw 13*a*.

The invention claimed is:

1. A supporting structure for a roof mounted bike carrier having a wheel tray, the supporting structure comprising:
   a first attachment part and a second attachment part being separable from said first attachment part; and
   a bike supporting device having a coupling section coupled to said first attachment part and adapted to support a bike with a supporting section thereof,
   wherein said first attachment part and said second attachment part are adapted to be invertedly couplable to provide respective reversed positions of said bike supporting device with respect to said second attachment part.

2. The supporting structure according to claim 1, wherein said first attachment part comprises a cross bar attachment part fixedly mountable on a cross bar of a vehicle load carrier system.

3. The supporting structure according to claim 1, wherein said second attachment part comprises a wheel tray attachment part fixedly mountable to an underside of a wheel tray of said bike carrier.

4. The supporting structure according to claim 1, wherein said bike supporting device is rotatably coupled to said first attachment part, wherein in a mounted condition an axis of rotation of said bike supporting device is parallel to a cross bar of a load carrier system of a vehicle.

5. The supporting structure according to claim 4, wherein said bike supporting device and said first attachment part form an integral assembly.

6. The supporting structure according to claim 1, further comprising a quick release mechanism adapted to couple and decouple said first attachment part and said second attachment part.

7. The supporting structure according to claim 6, wherein said quick release mechanism comprises a rotatable coupling element rotatable between a locking position in which said second attachment part is fixedly coupled to said first attachment part and an unlocking position in which said second attachment part is separable from said first attachment part.

8. The supporting structure according to claim 7, wherein said rotatable coupling element is adapted to be moved one-quarter rotation from said locking position to said unlocking position.

9. The supporting structure according to claim 7, wherein said rotatable coupling element is configured to be operated by hand or by a screw driver.

10. The supporting structure according to claim 1, wherein said first attachment part and said second attachment part comprise attachment openings adapted to accommodate attachment means to fix said first and second attachment part to a cross bar of a load carrier system, wherein said attachment openings are arranged in said first and second attachment parts such that attachment openings of said second attachment part are aligned with attachment openings of said first attachment part when said attachment parts are coupled to each other, and wherein said attachment openings are arranged symmetrically on said attachment parts.

11. The supporting structure according to claim 10, further adapted to support said attachment means, said attachment means comprising a tensioning member and an engaging member, wherein said engaging member is formed as a T-shaped element and adapted to engage a corresponding nut, and wherein said attachment openings in said first attachment part are formed such that said engaging member is passable therethrough.

12. The supporting structure according to claim 1, wherein said first attachment part comprises a covered bottom portion adapted to contact a cross bar of a load carrier system, wherein said covered bottom portion comprises a substantially continuous surface adapted to prevent accumulation of dirt on said load carrier and adapted to reduce noise generation.

13. The supporting structure according to claim 1, wherein said supporting section is adapted to hold a bike frame, a crank arm, or a wheel of a bike.

14. A roof mountable bike carrier, comprising:
   a wheel tray; and
   a supporting structure comprising:
      a first attachment part and a second attachment part being separable from said first attachment part, and
      a bike supporting device having a coupling section coupled to said first attachment part and adapted to support a bike with a supporting section thereof,
      wherein said first attachment part and said second attachment part are configured to be invertedly couplable to provide respective reversed positions of said bike supporting device with respect to said second attachment part,
   wherein said supporting structure is mounted to said wheel tray with said second attachment part being attached to an underside of said wheel tray.

* * * * *